(12) United States Patent
Yu et al.

(10) Patent No.: US 11,876,592 B2
(45) Date of Patent: *Jan. 16, 2024

(54) METHOD AND APPARATUS FOR SCELL BEAM FAILURE RECOVERY CONFIGURATION

(71) Applicant: Hannibal IP LLC, Frisco, TX (US)

(72) Inventors: Chia-Hao Yu, Yilan (TW); Chia-Hung Wei, Hsinchu (TW)

(73) Assignee: Hannibal IP LLC, Frisco, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/942,659

(22) Filed: Sep. 12, 2022

(65) Prior Publication Data

US 2023/0071447 A1 Mar. 9, 2023

Related U.S. Application Data

(63) Continuation of application No. 16/791,778, filed on Feb. 14, 2020, now Pat. No. 11,483,054.

(Continued)

(51) Int. Cl.
*H04W 36/30* (2009.01)
*H04B 7/08* (2006.01)
(Continued)

(52) U.S. Cl.
CPC ............ *H04B 7/088* (2013.01); *H04W 16/28* (2013.01); *H04W 72/046* (2013.01); *H04W 72/23* (2023.01); *H04W 80/02* (2013.01)

(58) Field of Classification Search
None
See application file for complete search history.

(56) References Cited

U.S. PATENT DOCUMENTS 10,674,383 B2 6/2020 Yu
10,805,148 B2 10/2020 Zhou
(Continued)

FOREIGN PATENT DOCUMENTS

CN 108696889 A 10/2018
CN 109314875 A 2/2019
(Continued)

OTHER PUBLICATIONS

International Preliminary Report on Patentability dated Aug. 10, 2021 for International Patent Application No. PCT/CN2020/075234.

(Continued)

*Primary Examiner* — Sithu Ko
(74) *Attorney, Agent, or Firm* — Marcella M. Boder; Cole Schotz, P.C.

(57) ABSTRACT

A method for SCell BFR performed by a UE is provided. The method includes: receiving a first SCell BFR configuration corresponding to a first SCell, the first SCell BFR configuration including at least one of a resource list for BFD and a resource list for NBI; detecting a beam failure condition in the first SCell by measuring at least one BFD reference signal; determining a first new candidate beam index for the first SCell based on the first SCell BFR configuration; and transmitting a beam failure recovery request that includes a cell index of the first SCell in which beam failure occurs and the determined first new candidate beam index.

18 Claims, 4 Drawing Sheets

Related U.S. Application Data

(60) Provisional application No. 62/806,081, filed on Feb. 15, 2019.

(51) Int. Cl.
    *H04W 16/28*     (2009.01)
    *H04W 80/02*     (2009.01)
    *H04W 72/23*     (2023.01)
    *H04W 72/044*     (2023.01)

(56) References Cited

U.S. PATENT DOCUMENTS

| | | | | |
|---|---|---|---|---|
| 10,863,570 | B2 | 12/2020 | Cirik | |
| 10,925,094 | B2 | 2/2021 | Patel | |
| 11,057,940 | B2 | 7/2021 | Agiwal | |
| 11,121,758 | B2 * | 9/2021 | Venugopal | H04B 7/0695 |
| 11,228,948 | B2 * | 1/2022 | Murray | H04L 5/0048 |
| 11,245,458 | B2 * | 2/2022 | Jiang | H04W 76/19 |
| 11,395,362 | B2 * | 7/2022 | Yang | H04W 74/0833 |
| 11,477,699 | B2 * | 10/2022 | Asterjadhi | H04W 28/26 |
| 11,483,054 | B2 | 10/2022 | Yu | |
| 11,546,108 | B2 * | 1/2023 | Chen | H04W 72/23 |
| 11,558,814 | B2 * | 1/2023 | Ang | H04W 52/0206 |
| 2018/0227899 | A1 | 8/2018 | Yu | |
| 2019/0253941 | A1 | 8/2019 | Cirik | |
| 2019/0306924 | A1 | 10/2019 | Zhang | |
| 2020/0137821 | A1 | 4/2020 | Cirik | |
| 2020/0178338 | A1 | 6/2020 | Ahn | |
| 2020/0205193 | A1 | 6/2020 | Amuru | |
| 2020/0214035 | A1 | 7/2020 | Chen | |
| 2020/0275524 | A1 | 8/2020 | Wang | |
| 2020/0374960 | A1 | 11/2020 | Deenoo | |
| 2020/0404638 | A1 | 12/2020 | Deogun | |
| 2021/0058132 | A1 | 2/2021 | Xu | |
| 2021/0058998 | A1 | 2/2021 | Yuan | |
| 2021/0068162 | A1 | 3/2021 | Agiwal | |
| 2021/0409091 | A1 | 12/2021 | Svedman et al. | |
| 2022/0039077 | A1 | 2/2022 | Koskela | |
| 2022/0109547 | A1 * | 4/2022 | Svedman | H04L 5/0091 |

FOREIGN PATENT DOCUMENTS

| | | |
|---|---|---|
| CN | 113455075 A | 9/2021 |
| EP | 3925351 A1 | 12/2021 |
| IN | 202247020326 | 4/2022 |
| WO | 2019027294 | 2/2019 |
| WO | 2019032882 | 2/2019 |
| WO | 2020164579 A1 | 8/2020 |

OTHER PUBLICATIONS

International Search Report dated May 8, 2020 for International Patent Application No. PCT/CN2020/075234.
Written Opininion of the International Searching Authority dated May 8, 2020 for International Patent Application No. PCT/CN2020/075234.
Convida Wireless On Beam Failure Recovery for SCell 3GPP TSG-RAN WGI Ad-Hoc Meeting 1901 Jan. 21, 2019-Jan. 25, 2019 Taipei, Taiwan, Draft R1-1901206 Jan. 20, 2019(Jan. 20, 2019), 2. Discussion and 3. Conclusion.
Intel Corporation On Beam Management Enhancement 3GPP TSG RAN WGI Ad-Hoc Meeting 1901 Jan. 21, 2019-Jan. 25, 2019 Taipei, 3GPP Draft, R1-1900503 Jan. 20, 2019(Jan. 20, 2019), the whole document.
Extended European Search Report dated Oct. 10, 2022 for corresponding European Patent Application No. 20755819.8.
Notice of Allowance dated Jul. 26, 2022 for corresponding U.S. Appl. No. 16/791,778.
Non-Final Office Action dated Jul. 13, 2021 for corresponding U.S. Appl. No. 16/791,778.
Final Office Action dated Dec. 9, 2021 for corresponding U.S. Appl. No. 16/791,778.
Non-Final Office Action dated Mar. 22, 2022 for corresponding U.S. Appl. No. 16/791,778.
Issue Notification dated Oct. 5, 2022 for corresponding U.S. Appl. No. 16/791,778.
5G, 3GPP TS 38.212 V16.1.0, 2020, 3rd Generation Partnership Project; Technical Specification Group Radio Access Network; NR; Multiplexing and Channel Coding (Release 16).
5G. 3GPP TS 38.213 V15.2.0, 2018, 3rd Generation Partnership Project; Technical Specification Group Radio Access Network; NR; Physical layer procedures for control, (Release 15).
5G. 3GPP TS 38.214 V15.2.0, 2018, 3rd Generation Partnership Project; Technical Specification Group Radio Access Network; NR; Physical Layer procedures for data (Release 15).
5G, 3GPP TS 38.300 V16.0.0., 2019, 3rd Generation Partnership Project; Technical Specification Group Radio Access Network; NR; NR and NG-Ran Overall Description; Stage 2, Release 16).
3GPP TSG-RAN WG2 Meeting #109-e, e-meeting, 2020, R2-2002202, Change Request, 38.321, CR 0692, rev 1, Current Version 15.8.0.
5G, 3GPP TS 38.331, V15.2.0, 2018, 3rd Generation Partnership Project; Technical Specification Group Radio Access Network; NR; Radio Resource Control (RRC) protocol specification (Release 15).
3GPP TSG-RAN WG2 #109 electronic, 2020, Change Request, Tdoc R2-2001217, 38.331 CR rev Current version: 15.7.0.
3GPP TSG-RAN2 Meeting # 108, R2-1916343, Change Request 38.331 CR draft CR rev Current Version 15.7.0.
3GPP TSG-RAN WG2 Meeting # 109 electronic, R2-2001109, Change Request, 38.331 CR draftCR rev, Current Version 15.8.0.
3GPP TSG-RAN WG2 Meeting #109 electronic, R2-2000767, Change Request 38.321 CR 0691 rev Current Version 15.8.0.
Final Examination Report dated Aug. 17, 2023 for corresponding Indian Patent Application No. 202247020326.
5G, 3GPP TS 38.212 V16.0.0, 2019, 3rd Generation Partnership Project; Technical Specification Group Radio Access Network; NR; Multiplexing and channel coding (Release 16).
5G, 3GPP TS 38.213 V16.0.0, 2019, 3rd Generation Partnership Project; Technical Specification Group Radio Access Network; NR; Physical layer procedures for control (Release 16).
5G, 3GPP TS 38.214 V16.0.0, 2019, 3rd Generation Partnership Project; Technical Specification Group Radio Access Network; NR; Physical layer procedures for data (Release 16).
5G 3GPP TS 38.331 V15.8.0, 2019, 3rd Generation Partnership Project; Technical Specification Group Radio Access Network; NR; Radio Resource Control (RRC) protocol specification (Release 15).

* cited by examiner

METHOD AND APPARATUS FOR SCELL BEAM FAILURE RECOVERY CONFIGURATION

CROSS-REFERENCE TO RELATED APPLICATION(S)

The present application is a continuation of U.S. patent application Ser. No. 16/791,778, filed Feb. 14, 2020 and which claims the benefit of and priority of provisional U.S. Patent Application Ser. No. 62/806,081, filed on Feb. 15, 2019, the entire disclosures of which are hereby incorporated fully by reference into the present application.

FIELD

The present disclosure generally relates to wireless communication, and more particularly, to a method for beam failure recovery (BFR) in cellular wireless communication networks.

BACKGROUND

Various efforts have been made to improve different aspects of wireless communications, such as data rate, latency, reliability and mobility, for cellular wireless communication systems (e.g., fifth generation (5G) New Radio (NR)). For example, beam management introduced in a NR system establishes and retains a suitable beam pair link, specifically a transmitter-side beam direction and a corresponding receiver-side beam direction that jointly provide good connectivity. In some cases, movements in the environment may lead to an established beam pair link being rapidly blocked. In NR, a BFR procedure is introduced to handle such beam failure events. In addition, carrier aggregation (CA) is supported in NR. A Primary Cell (PCell) may operate in sub-6 GHz frequency bands (Frequency Range 1, FR1) and a Secondary Cell (SCell) may operate in frequency bands above 24 GHz (Frequency Range 2, FR2). Beam failure (e.g. beam blockage) happens more frequently in FR2 because of the channel characteristics of the millimeter wave propagation. Therefore, there is a need in the industry for an improved and efficient mechanism for a user equipment (UE) to handle beam failure recovery in the SCell.

SUMMARY

The present disclosure is directed to a method for SCell BFR performed by a UE in the next generation wireless communication networks.

According to an aspect of the present disclosure, a UE is provided that includes one or more non-transitory computer-readable media containing computer-executable instructions embodied therein and at least one processor coupled to the one or more non-transitory computer-readable media. The at least one processor is configured to execute the computer-executable instructions to: receive a first SCell BFR configuration corresponding to a first SCell, the first SCell BFR configuration including at least one of a resource list for beam failure detection (BFD) and a resource list for new beam identification (NBI); detect a beam failure condition in the first SCell by measuring at least one BFD reference signal; determine a first new candidate beam index for the first SCell based on the first SCell BFR configuration; and transmit a beam failure recovery request that includes a cell index of the first SCell in which beam failure occurs and the determined first new candidate beam index.

According to another aspect of the present disclosure, a method for SCell BFR performed by a UE is provided. The method includes: receiving a first SCell BFR configuration corresponding to a first SCell, the first SCell BFR configuration including at least one of a resource list for beam BFD and a resource list for NBI; detecting a beam failure condition in the first SCell by measuring at least one BFD reference signal; determining a first new candidate beam index for the first S Cell based on the first SCell SFR configuration; and transmitting a beam failure recovery request that includes a cell index of the first SCell in which beam failure occurs and the determined first new candidate beam index.

BRIEF DESCRIPTION OF THE DRAWINGS

Aspects of the example disclosure are best understood from the following detailed description when read with the accompanying drawings. Various features are not drawn to scale. Dimensions of various features may be arbitrarily increased or reduced for clarity of discussion.

DETAILED DESCRIPTION

Figure 1:
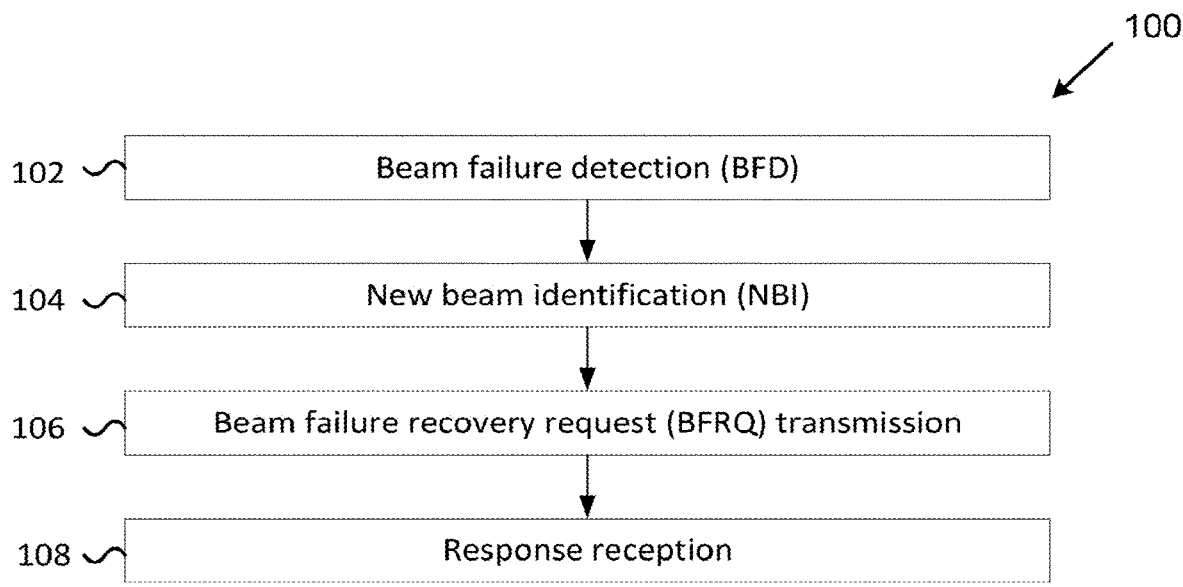
FIG. 1 is a flowchart of a method for beam failure recovery performed by a UE, according to an example implementation of the present application.

The following description contains specific information pertaining to implementations of the present application. The drawings in the present application and their accompanying detailed description are directed to merely example implementations. However, the present application is not limited to merely these example implementations. Other variations and implementations of the present application will be obvious to those skilled in the art. Unless noted otherwise, like or corresponding elements among the drawings may be indicated by like or corresponding reference numerals. Moreover, the drawings and illustrations in the present application are generally not to scale and are not intended to correspond to actual relative dimensions.

For the purpose of consistency and ease of understanding, like features may be identified (although, in some examples, not shown) by the same numerals in the drawings. However, the features in different implementations may be differed in other respects, and thus shall not be narrowly confined to what is shown in the drawings.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising" means "including, but not necessarily limited to"; it specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present application may be implemented by hardware, software or a combination of software and hardware. Described functions may correspond to modules which may be software, hardware, firmware, or any combination thereof. The software implementation may comprise computer executable instructions stored on a computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processor (DSPs). Although some of the described implementations are oriented to software installed and executing on computer hardware, alternative implementations implemented as firmware or as hardware or combination of hardware and software are well within the scope of the present application.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G NR Radio Access Network (RAN)) typically includes at least one base station (BS), at least one UE, and one or more optional network elements that provide connection within a network. The UE communicates with the network (e.g., a Core Network (CN), an Evolved Packet Core (EPC) network, an Evolved Universal Terrestrial Radio Access network (E-UIRAN), a 5G Core (5GC), or an internet), through a RAN established by one or more base stations.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A base station may be configured to provide communication services according to at least one of the following Radio Access Technologies (RATs): Worldwide Interoperability for Microwave Access (WiMAX), Global System for Mobile communications (GSM) that is often referred to as 2G, GSM Enhanced Data rates for GSM Evolution (EDGE) Radio Access Network (GERAN), General Packet Radio Service (GPRS), Universal Mobile Telecommunication System (UMTS) that is often referred to as 3G based on basic wideband-code division multiple access (W-CDMA), high-speed packet access (HSPA), LIE, LIE-A, evolved LTE (eLTE), e.g., LTE connected to 5GC, NR (often referred to as 5G), and/or LIE-A Pro. However, the scope of the present application should not be limited to the listed protocols.

A base station may include, but is not limited to, a node B (NB) as in the UMTS, an evolved node B (eNB) as in LTE or LTE-A, a radio network controller (RNC) as in the UMTS, a base station controller (BSC) as in the GSM/GERAN, a ng-eNB as in an E-UTRA base station in connection with the 5GC, a next generation Node B (gNB) as in the 5G-RAN, and any other apparatus capable of controlling radio communication and managing radio resources within a cell. The base station may serve one or more UEs through a radio interface.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage (e.g., each cell schedules the downlink (DL) and optionally uplink (UL) resources to at least one UE within its radio coverage for DL and optionally UL packet transmissions). The base station can communicate with one or more UEs in the radio communication system through the plurality of cells. A cell may allocate sidelink (SL) resources for supporting Proximity Service (ProSe) or Vehicle to Everything (V2X) service. Each cell may have overlapped coverage areas with other cells.

As discussed previously, the frame structure for NR supports flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology in the 3rd Generation Partnership Project (3GPP) may serve as a baseline for an NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval (TTI) of a single NR frame, at least DL transmission data, a guard period, and an uplink (UL) transmission data should be included. The respective portions of the DL transmission data, the guard period, and the UL transmission data should also be configurable, for example, based on the network dynamics of NR. In addition, sidelink resources may also be provided in an NR frame to support ProSe services or V2X services.

The terms "system" and "network" as used herein may be used interchangeably. The term "and/or" as used herein is only an association relationship for describing associated objects and represents that three relationships may exist. For example, A and/or B may indicate that: A exists alone, A and B exist at the same time, or B exists alone. In addition, the character "/" as used herein generally represents that the associated objects are in an "or" relationship.

FIG. 1 is a flowchart of a method 100 for beam failure recovery performed by a UE, according to an example implementation of the present application. In action 102, the UE may perform BFD to detect a beam failure condition in a cell (e.g., an SCell). The UE may be explicitly or implicitly configured with a set of BFD reference signals (RS), which may include a Channel State Information Reference Signal (CSI-RS) and a Synchronization Signal Block (SSB). In one implementation, an explicit configuration of the BFD RS may be transmitted via Radio Resource Control (RRC) signaling. On the other hand, the UE may determine the BFD RS by itself if the BFD RS is implicitly configured. The UE may detect the beam failure condition by measuring the BFD RS, such as determining a BLock Error Rate (BLER) based on the measurement of the BFD RS. In one implementation, each time the determined BLER exceeds a threshold may be considered as a beam failure instance, and the UE may declare a beam failure condition is detected when the number of consecutive beam failure instances exceeds a specific value.

In action 104, the UE may perform NBI to find a new beam pair link on which connectivity between the UE and an associated BS may be restored. The UE may be explicitly or implicitly configured with a set of NBI RS, which may include CSI-RS and/or SSB. In one implementation, an explicit configuration of the NBI RS may be transmitted via RRC signaling. On the other hand, the UE may determine the NBI RS by itself if the NBI RS is implicitly configured. The set of NBI RS may correspond to a set of candidate beams. The UE may determine a new candidate beam from the set of NBI RS. In one implementation, the UE may measure the quality (e.g., L1-RSRP) of the NBI RS to choose the new candidate beam from the set of NBI RS. It should be noted that the order of actions described in FIG. 1 is not intended to be construed as a limitation. For example, action 104 may be followed by action 102 in one implementation.

In action 106, the UE may transmit a beam failure recovery request (BFRQ) to a base station after the UE has detected a beam failure condition. In one implementation, the UE may have identified a new candidate beam (e.g., in action 104) before transmitting the BFRQ as well. The BFRQ informs the network that a beam failure has been detected. In one implementation, the BFRQ may include information about the new candidate beam.

In one implementation, for beam failure that takes place in a special cell (e.g., a PCell or a PSCell), the BFRQ may be transmitted on a Physical Random Access Channel (PRACH). In principle, both contention-free and contention-based PRACH resources may be used. In one implementation, a contention-free PRACH resource may be prioritized over contention-based PRACH resource. A two-step contention-free random access procedure may include preamble transmission and random access response. In one implementation, each reference signal corresponding to the different candidate beams may be associated with a specific preamble configuration.

In action 108, the UE may receive response from the network. In one implementation, a specific control resource set (CORESET) or search space is defined for response reception (e.g., CORESET-BFR or a SearchSpace-BFR indicated by a higher layer parameter recoverySearchSpaceId). The UE may monitor Physical Downlink Control Channel (PDCCH) transmission on the CORESET-BFR/SeachSpace-BFR to determine if the BFRQ is successfully received by the network. A Downlink Control Information (DCI) format in the CORESET-BFR/SeachSpace-BFR may be considered as a successful network response. In one implementation, the UE may assume that the network, when responding the BFRQ, is transmitting PDCCH quasi co-located (QCL) with the RS associated with the new candidate beam in the BFRQ.

It should be noted that the term "beam" may be replaced by "spatial filter". For example, when the UE reports a new candidate beam (e.g., a gNB TX beam), the UE is essentially selecting a spatial filter used by the gNB. The term "beam information" may represent information indicating which beam is used or which spatial filter is selected. In one implementation, individual reference signals may be transmitted by applying individual beams (or spatial filters). Thus, beam information may be represented by reference signal resource indexes.

The previous description relates to PRACH-based BFRQ transmission and network response, which may be used in a special cell BFR procedure. For BFR in an SCell, the BFRQ in action 106 in FIG. 1 may be transmitted on a PRACH, a Physical Uplink Shared Channel (PUSCH), or a Physical Uplink Control Channel (PUCCH). In one implementation, the BFRQ may be transmitted on the PUSCH. The UE may transmit a BFR Medium Access Control (MAC) Control Element (CE) on the PUSCH to carry the BFRQ. In one implementation, the BFRQ (e.g., the BFR MAC CE if BFRQ is transmitted on PUSCH) may include a cell index of an SCell in which beam failure occurs. In one implementation, the BFRQ (e.g., the BFR MAC CE) may include a cell index of an SCell in which beam failure occurs as determined in action 102 in FIG. 1 and a new candidate beam index for the SCell as determined in action 104 in FIG. 1. In one implementation, the PUSCH for transmitting the BFRQ may be obtained from a preceding scheduling request (SR) transmission via a PUCCH or from a configured grant resource.

Figure 2:
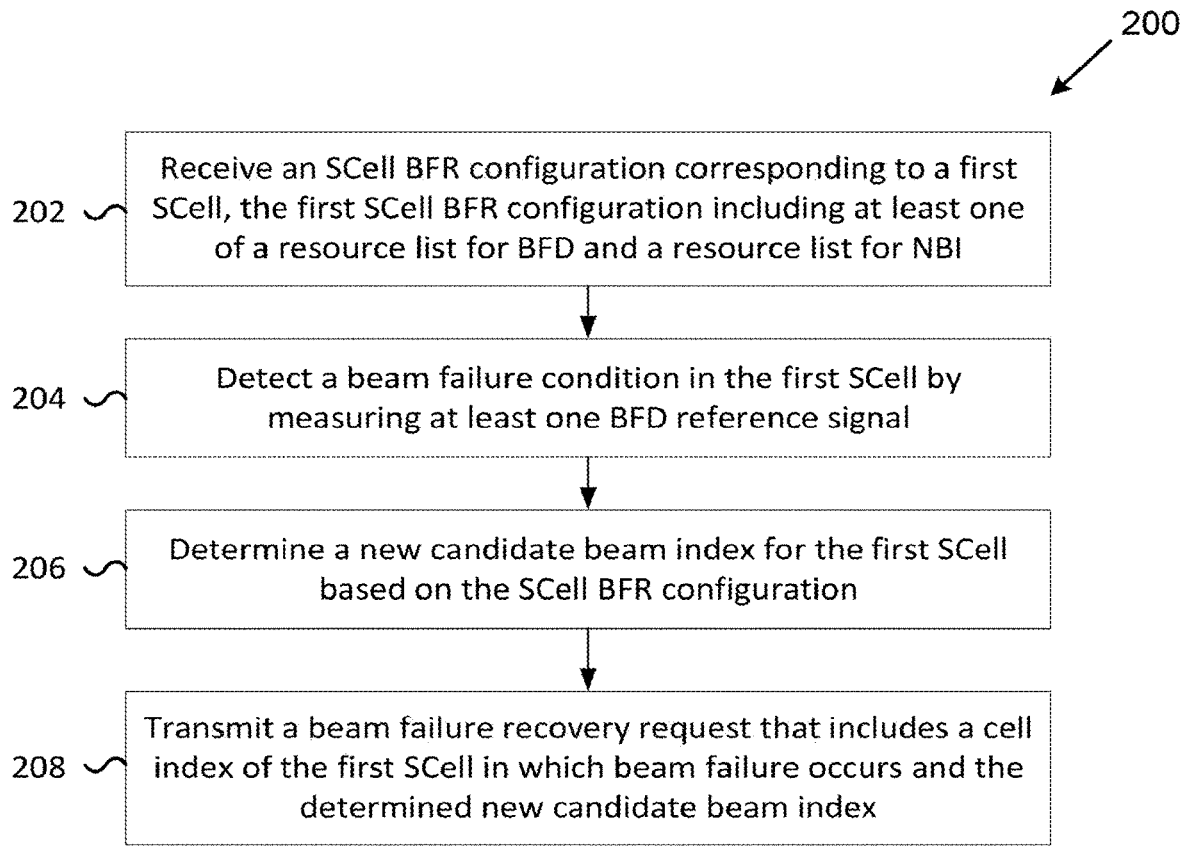
FIG. 2 is a flowchart of a method for SCell BFR performed by a UE according to an example implementation of the present application.

FIG. 2 is a flowchart of a method 200 for SCell BFR performed by a UE according to an example implementation of the present application. In action 202, the UE receives an SCell BFR configuration corresponding to a first SCell, where the SCell BFR configuration includes at least one of a resource list for BFD and a resource list for NBI. The SCell BFR configuration may be transmitted via RRC signaling. The resource list for BFD may be explicitly configured if it is included in the S Cell BFR configuration. The resource list for BFD may be implicitly configured if it is not included in the SCell BFR configuration. Similarly, the resource list for NBI may be explicitly/implicitly configured if it is included/not included in the SCell BFR configuration. The SCell BFR configuration may include only the resource list for BFD, only the resource list for NBI, or both the resource list for BFD and the resource list for NBI.

In carrier aggregation, the UE may be configured with one or more S Cells. In one implementation, the UE may receive one or more SCell BFR configurations, each SCell BFR configuration corresponding to one of the configured S Cells. For example, the UE may receive SCell BFR configuration #1 corresponding to SCell #1, SCell BFR configuration #2 corresponding to SCell #2, SCell BFR configuration #3 corresponding to SCell #3, and so on. In one implementation, the resource list for BFR and/or the resource list for NBI in each S Cell BFR configuration may be configured independently.

In action 204, the UE may detect a beam failure condition in the first SCell by measuring at least one BFD reference signal. In one implementation, the UE may measure signal quality, such as L1-RSRP, of the BFD reference signal to detect the beam failure condition. In another implementation, the UE may derive block error rate (BLER) based on the measurements on the BFD reference signal to detect the beam failure condition.

Case 1-1: Implicit Configuration of BFD Reference Signal

In one implementation, the SCell BFR configuration received in action 202 may not include the resource list for BFD. The UE may determine the at least one BFD reference signal based on at least one Transmission Configuration Indicator (TCI) state for each respective Control Resource Sets (CORESETs) that the UE uses for monitoring a Physical Downlink Control Channel (PDCCH). In one implementation, the at least one BFD reference signal may include reference signal indexes with QCL-TypeD configuration for the corresponding TCI state. In one implementation, the implicit determination of BFD reference signals may follow the same method as for special cell BFD reference signals implicit determination specified in 3GPP TS 38.213, e.g., V15.4.0.

In one implementation, the at least one BFD reference signal may be transmitted via the first SCell. In one implementation, the at least one BFD reference signal may be transmitted via another serving cell, where the first SCell and the another serving cell correspond to different component carriers. For example, the UE may receive SCell BFR configuration #1 for SCell #1 in action 202. The SCell BFR configuration #1 may not include the resource list for BFD. In one implementation, the BFD reference signal implicitly determined by the UE may be transmitted via SCell #1. In one implementation, the BFD reference signal implicitly determined by the UE may be transmitted via SCell #2, which provides coverage over a different component carrier than SCell #1. Therefore, the UE in action 204 may measure a BFD reference signal transmitted via S Cell #2 to detect a beam failure condition in SCell #1.

Case 1-2: explicit configuration of BFD reference signal

In one implementation, the BFD reference signal may be explicitly configured. The at least one BFD reference signal may be configured in the resource list for BFD. In one implementation, the at least one BFD reference signal may be transmitted via the first SCell. For example, the UE may receive SCell BFR configuration #1 for SCell #1 in action 202. The SCell BFR configuration #1 may include the resource list for BFD, which may include one or more BFD reference signals transmitted via SCell #1.

Case 2: Configuration of NBI Reference Signal

In action 206, the UE may determine a new candidate beam index for the first SCell based on the S Cell BFR configuration. In one implementation, to determine the new candidate beam, the UE may determine the new candidate beam by selecting one NBI reference signal from the resource list for NBI based on a predetermined rule (e.g., based on an index of the NBI reference signals). In one preferred implementation, the resource list for NBI may be obtained from the SCell BFR configuration. In one implementation, the UE may measure signal quality, such as L1-RSRP, of the NBI reference signal configured in the resource list for NBI to determine the new candidate beam index (e.g., the NBI reference signal having the best signal quality may be selected, or the NBI reference signal(s) whose signal quality is better than a threshold may be selected).

In one implementation, the resource list for NBI may include an NBI reference signal transmitted via the first SCell. In one implementation, a reference signal corresponding to the new candidate beam index may be transmitted via the first SCell. For example, the UE may receive SCell BFR configuration #1 for SCell #1 in action 202. The SCell BFR configuration #1 may include the resource list for NBI, which may include one or more NBI reference signals transmitted via SCell #1. The UE may then select one NBI reference signal from the resource list for NBI as the new candidate beam index. The selected NBI reference signal corresponding to the new candidate beam may be transmitted via SCell #1.

In one implementation, the resource list for NBI may include an NBI reference signal transmitted via a serving cell other than the first SCell, where the first SCell and the other serving cell may correspond to different component carriers. In one implementation, a reference signal corresponding to the new candidate beam index may be transmitted via the other serving cell. For example, the UE may receive SCell BFR configuration #1 for SCell #1 in action 202. The SCell BFR configuration #1 may include the resource list for NBI, which may include one or more NBI reference signals transmitted via SCell #2, thereby providing coverage over a different component carrier than SCell #1. The UE in action 206 may measure NBI reference signal transmitted via SCell #2 to determine the new candidate beam index for S Cell #1. The selected NBI reference signal corresponding to the new candidate beam may be transmitted via SCell #2.

In action 208, the UE may transmit a BFRQ that includes a cell index of the first S Cell in which beam failure occurs and the new candidate beam index for the first SCell. In one implementation, the UE may receive multiple SCell BFR configurations (e.g., including SCell BFR configuration #1 corresponding to SCell #1, SCell BFR configuration #2 corresponding to SCell #2, SCell BFR configuration #3 corresponding to SCell #3, and so on). In one implementation, the UE may detect beam failure conditions in multiple SCells (e.g., beam failure detected in SCell #1 and SCell #3). The UE may determine a new candidate beam index for each SCell in which beam failure occurs. In one implementation, the BFRQ transmitted in action 208 may include multiple cell indexes and multiple new candidate beam indexes (e.g., the BFRQ may include cell index of SCell #1, the new candidate beam index for SCell #1, cell index of SCell #3, and the new candidate beam index for SCell #3).

Figure 3:
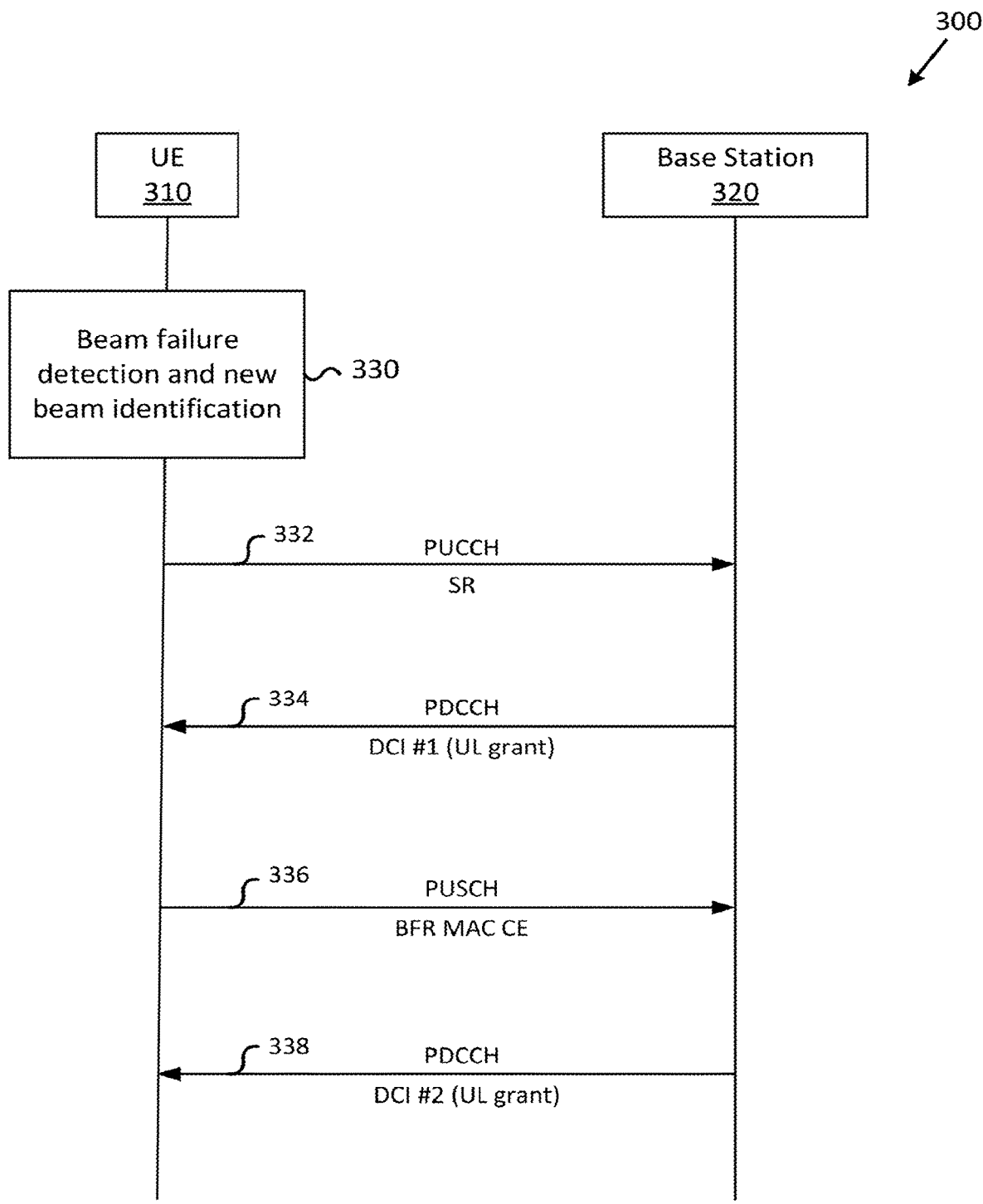
FIG. 3 includes a diagram illustrating a method for an SCell BFR procedure according to an example implementation of the present application.

FIG. 3 is a diagram illustrating a method 300 for an SCell BFR procedure according to an example implementation of the present application. In action 330, the UE 310 performs beam failure detection and new beam identification. In one implementation, the BFRQ may be a BFR MAC CE that carries a cell index of an SCell in which beam failure occurs and a new candidate beam index for the SCell. In one implementation, the UE 310 may transmit a scheduling request (SR) to base station 320 in action 332 to request an UL resource for transmitting the BFR MAC CE. In one implementation, the SR in action 332 may be specifically configured for BFR. The SR may be transmitted on a PUCCH.

In action 334, the UE 310 may receive from base station 320 DCI #1 (e.g., UL grant) that schedules a PUSCH transmission via which the BFR MAC CE may be transmitted. DCI #1 may be transmitted on a PDCCH. In action 336, the UE 310 may transmit the BFR MAC CE on a PUSCH scheduled by DCI #1 to base station 320. In action 338, the UE 310 may receive DCI #2 (e.g., UL grant) from base station 320 in response to the BFR MAC CE. In one implementation, the UE 310 may consider the SCell BFR procedure as successfully completed after receiving DCI #2 in action 338.

Case 3: BFRQ transmission when multiple BFRs are triggered

A UE configured with multiple serving cells may declare multiple serving cells (e.g., SCells) in beam failure at the same time. Multiple BFRQ messages may be pending for delivery. There may be a BFRQ message delivery issue when multiple BFR procedures are triggered at the same time. For example, the BFRQ may be transmitted on a PRACH, a PUSCH, or a PUCCH. If PRACH is used for BFRQ transmission, the issue may be that only one RACH procedure may be allowed within a single MAC entity at a time. For PUCCH, the issue may be that the PUCCH resource may have only limited payload size depending on the configuration. For UL MAC CE transmitted on a PUSCH, the MAC CE may have a fixed or variable payload size.

In one implementation, the UE may prioritize BFRQ information from certain SCells so that BFRQ information from such SCells may be transmitted promptly. For other SCells, the corresponding BFRQ information may be either abandoned or put on hold until there is free/available payload size. For example, the UE may categorize the configured SCells into a first subset and a second subset, where the first subset has a higher priority than the second subset. The UE may prioritize the transmission of BFRQ information related to SCells in the first subset, while the transmission of BFRQ information related to S Cells in the second subset may be dropped or postponed. In this way, BFR in prioritized SCells may still be resolved successfully even if the radio resource for transmitting the BFRQ has only limited payload size.

In one implementation, only a subset of SCell BFRQ information (e.g., a prioritized subset) may be transmitted. In one implementation, the rest of the S Cell BFRQ information may be on hold until some BFRQ in the prioritized subset is served and corresponding BFR is resolved. In one implementation, the rest of the SCell BFRQ information may be abandoned. For example, the UE may abandon the beam failure declaration and restart beam failure detection in the corresponding SCell(s). In one implementation, the UE may rely on the network to determine when to again trigger BFD for the corresponding SCell. In one implementation, the prioritized subset may only contain one S Cell in which beam failure occurs.

A PRACH may be used for BFRQ transmission. In one implementation, the UE may be allowed to perform multiple RACH procedures simultaneously if the number of SCells in a subset is greater than one. In one implementation, the maximum number of simultaneous RACH procedures may be two or, in other words, the maximum number of S Cells in a subset may be two.

In one implementation, there may be no constraint on the maximum number of simultaneous RACH procedures. The maximum number of simultaneous RACH procedures may depend on the UE's implementation.

In one implementation, different subsets of SCell BFRQ information may be carried by multiple transmission instances. For example, multiple PUCCH transmission instances may be used to carry BFRQ information or multiple UL MAC CE in multiple MAC Protocol Data Units (PDUs) may be used to carry BFRQ information. In one implementation, BFRQ information from different subsets may be transmitted in parallel. For example, when the serving cells are categorized into the first subset and the second subset, transmission of BFRQ information from the second subset may take place before the BFR procedure of the first subset is resolved such that the UE may not need to suspend the transmission of BFRQ information from the second subset until the BFR procedure corresponding to the first subset is resolved.

In one implementation, the UE may decide which serving cells belong to the prioritized subset based on a configured or a predetermined priority rule. In one implementation, the priority rule may be based on the cell index of the serving cell. For example, a serving cell having a lower cell index may be prioritized. In one implementation, the PCell may be prioritized, and priorities of other serving cells may be based on the UE implementation. In one implementation for FR2, the lowest-indexed serving cell in which beam failure occurs may be prioritized, and priorities of other serving cells may be based on the UE implementation. In one implementation, the subset selection (e.g., determining which serving cells belong to the prioritized subset) may be configured by the network (e.g., the network may configure or indicate a priority for each serving cell). In one implementation, the subset selection may depend on UE implementation. In one implementation, the UL transmission carrying the BFRQ information may also indicate whether the reported SCell BFRQ information includes all beam failed SCells.

Figure 4:
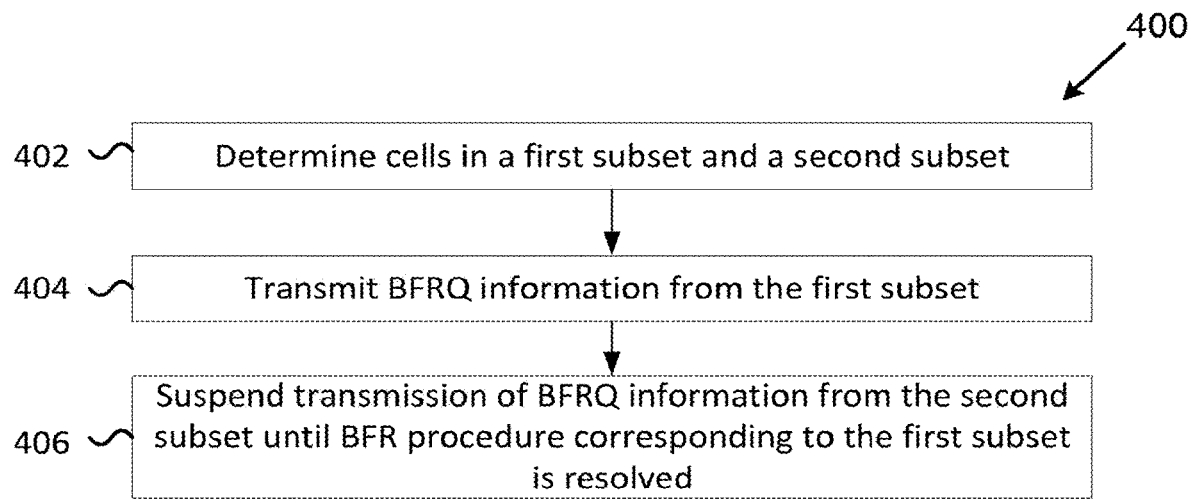
FIG. 4 is a flowchart of a method for BFRQ transmission when multiple BFRs are triggered according to an example implementation of the present application.

FIG. 4 is a flowchart of a method 400 for BFRQ transmission when multiple BFRs are triggered according to an example implementation of the present application. In action 402, the UE may determine cells in a first subset and a second subset. The first subset may have a higher priority than the second subset. In action 404, the UE may transmit BFRQ information from the first subset. In action 406, the UE may suspend transmission of BFRQ information from the second subset until BFR procedure corresponding to the first subset is resolved. For example, transmission of BFRQ information from the second subset may be dropped or postponed.

Case 4: SCell BFR in Cross-Carrier Scheduling

Figure 5:
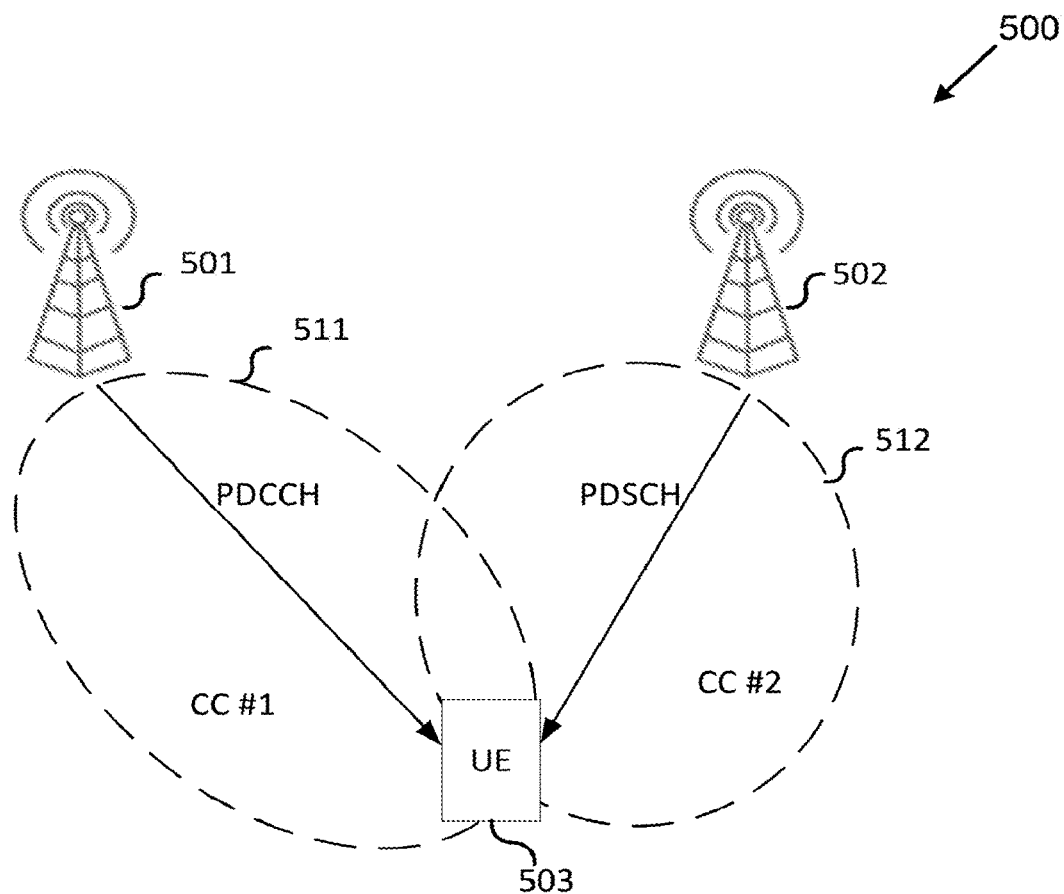
FIG. 5 includes a diagram illustrating an example cross-carrier scheduling scenario according to an example implementation of the present application.

FIG. 5 is a diagram 500 illustrating a cross-carrier scheduling scenario according to an example implementation of the present application. A BS 501 may provide coverage over component carrier (CC) #1 and a BS 502 may provide coverage over CC #2. As illustrated, cell 512 is cross-carrier scheduled by cell 511. In other words, a PDCCH on cell 511 may include scheduling information of a PDSCH on cell 512. Cell 511 may be referred as a scheduling cell and cell 512 may be referred to as a scheduled cell. In one implementation, cell 512 may be an SCell and cell 511 may be a PCell, a PSCell, or an SCell.

In one implementation, an SCell BFR procedure may be triggered in cell 512 to maintain the control channel quality of CC #2. For example, UE 503 may detect a beam failure condition in cell 512 and subsequently transmit a BFRQ. BFD (e.g., action 102 in FIG. 1) may be targeted for a CC #2 control channel and NBI (e.g., action 104 in FIG. 1) may be targeted for acquiring a CC #2 new beam for recovering a CC #2 control channel.

In one implementation, at least one of BFD RS(s) and NBI RS(s) may be provided in the scheduled cell (e.g., cell 512). In one implementation according to Case 1-2, the BFD RS may be explicitly configured and the BFD RS may be transmitted via cell 512. In one implementation according to Case 1-1, the BFD RS may be implicitly configured and the UE 503 may determine the BFD RS itself. In the cross-carrier scheduling scenario, the BFD RS may be implicitly configured to the cross-carrier scheduling cell (e.g., cell 511). Because the UE 503 monitors PDCCH on cell 511, the BFD RS may be transmitted via cell 511 when the BFD RS is implicitly configured. Therefore, the UE 503 may measure the BFD RS transmitted via cell 511 to detect a beam failure condition in cell 512.

In one implementation, NBI RS may need to be explicitly or mandatorily configured. Configuration of NBI RS may be referred to as Case 2. In one implementation, the resource list for NBI may include an NBI RS transmitted via cell 512. The UE 503 may determine a new candidate beam index from the configured resource list for NBI and a reference signal corresponding to the new candidate beam index may be transmitted via cell 512.

In one implementation, the resource list for NBI may include an NBI RS transmitted via cell 511. The UE 503 may determine a new candidate beam index from the configured resource list for NBI and a reference signal corresponding to the new candidate beam index may be transmitted via cell 511. Therefore, the UE 503 may measure NBI RS transmitted via cell 511 to determine the new candidate beam index for cell 512. In one implementation, the resource list for NBI may include an NBI RS transmitted via a serving cell other than cell 511 and cell 512 and a reference signal corresponding to the new candidate beam index may be transmitted via that serving cell.

Figure 6:
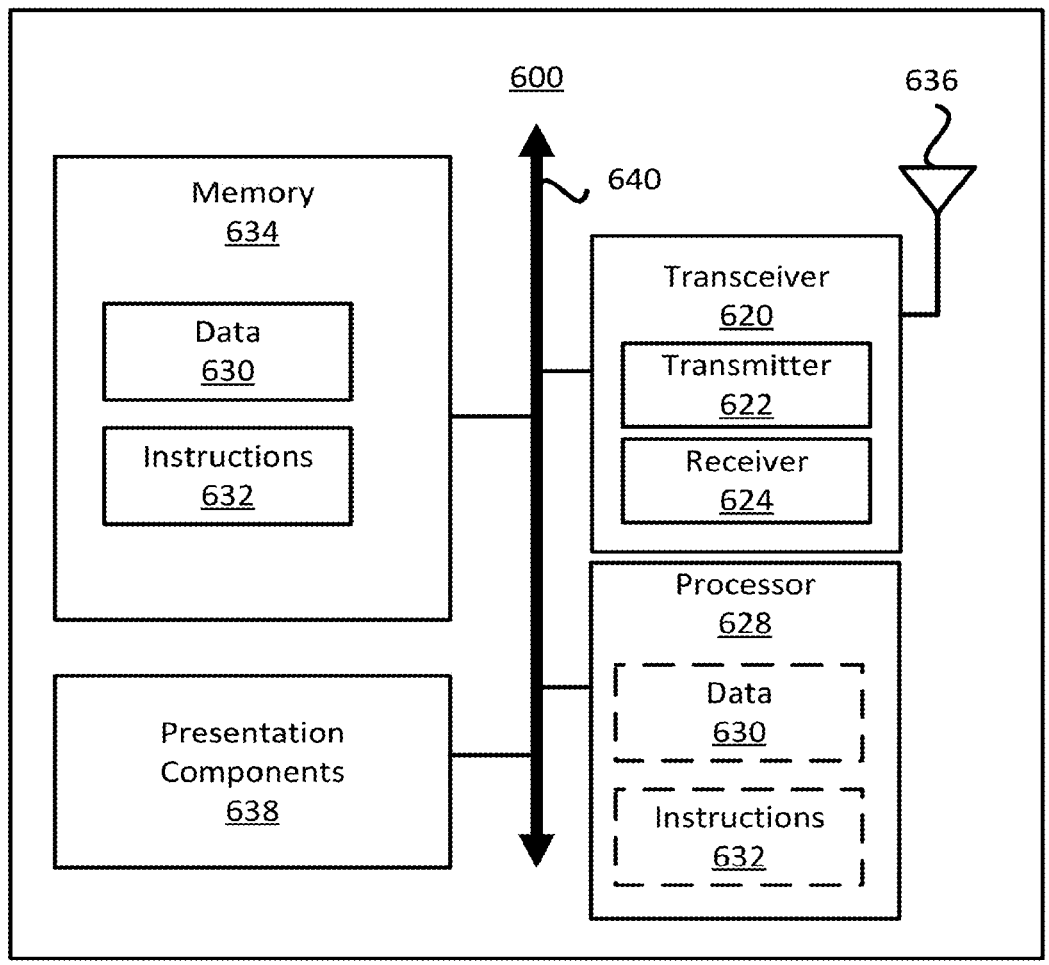
FIG. 6 is a block diagram illustrating a node for wireless communication, in accordance with various aspects of the present application.

FIG. 6 is a block diagram illustrating a node for wireless communication according to the present application. As illustrated in FIG. 6, a node 600 may include a transceiver 620, a processor 628, a memory 634, one or more presentation components 638, and at least one antenna 636. The node 600 may also include an RF spectrum band module, a base station (BS) communications module, a network communications module, and a system communications management module, Input/Output (I/O) ports, I/O components, and power supply (not explicitly shown in FIG. 6). Each of these components may be directly or indirectly in communication with each other over one or more buses 640. In one implementation, the node 600 may be a UE or a base station that performs various functions described herein with reference to FIGS. 1 through 5.

The transceiver 620 having a transmitter 622 (e.g., transmitting/transmission circuitry) and a receiver 624 (e.g., receiving/reception circuitry) may be configured to transmit and/or receive time and/or frequency resource partitioning information. In some implementations, the transceiver 620 may be configured to transmit in different types of subframes and slots including, but not limited to, usable, non-usable and flexibly usable subframes and slot formats. The transceiver 620 may be configured to receive data and control channels.

The node 600 may include a variety of computer-readable media. Computer-readable media may be any available media that may be accessed by the node 600 and include both volatile and non-volatile media, removable and non-removable media. By way of example, and not limitation, computer-readable media may comprise computer storage media and communication media. Computer storage media include both volatile and non-volatile, removable and non-removable media implemented in any method or technology for storage of information such as computer-readable instructions, data structures, program modules or data.

Computer storage media include RANI, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media do not comprise a propagated data signal. Communication media typically embody computer-readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the previously listed components should also be included within the scope of computer-readable media.

The memory 634 may include computer-storage media in the form of volatile and/or non-volatile memory. The memory 634 may be removable, non-removable, or a combination thereof. Example memory includes solid-state memory, hard drives, optical-disc drives, etc. As illustrated in FIG. 6, the memory 634 may store computer-readable, computer-executable instructions 632 (e.g., software codes) that are configured to cause the processor 628 to perform various functions described herein, for example, with reference to FIGS. 1 through 5. Alternatively, the instructions 632 may not be directly executable by the processor 628 but be configured to cause the node 600 (e.g., when compiled and executed) to perform various functions described herein.

The processor 628 (e.g., having processing circuitry) may include an intelligent hardware device, e.g., a Central Processing Unit (CPU), a microcontroller, an ASIC, etc. The processor 628 may include memory. The processor 628 may process the data 630 and the instructions 632 received from the memory 634, and information transmitted and received via the transceiver 620, the base band communications module, and/or the network communications module. The processor 628 may also process information to be sent to the transceiver 620 for transmission via the antenna 636 to the network communications module for transmission to a core network.

One or more presentation components 638 present data indications to a person or another device. Examples of presentation components 638 include a display device, a speaker, a printing component, and a vibrating component, etc.

In view of the disclosure, it is obvious that various techniques may be used for implementing the concepts in the present application without departing from the scope of those concepts. Moreover, while the concepts have been described with specific reference to certain implementations, a person of ordinary skill in the art may recognize that changes may be made in form and detail without departing from the scope of those concepts. As such, the described implementations are to be considered in all respects as illustrative and not restrictive. It should also be understood that the present application is not limited to the particular implementations described and many rearrangements, modifications, and substitutions are possible without departing from the scope of the present disclosure.

What is claimed is:

1. A user equipment (UE) comprising:
one or more non-transitory computer-readable media containing computer-executable instructions embodied therein; and
at least one processor coupled to the one or more non-transitory computer-readable media, the at least one processor configured to execute the computer-executable instructions to:

receive a special cell beam failure recovery (BFR) configuration corresponding to a first pecial cell, the special cell BFR configuration including at least one of a resource list for beam failure detection (BFD) and a resource list for new beam identification (NBI), the first special cell comprising one of a primary cell (PCell) and a primary secondary cell group (SCG) cell (PSCell);

detect a beam failure condition in the first special cell;

determine a first new candidate beam index for the first special cell based on the special cell BFR configuration;

transmit a scheduling request (SR) for BFR;

receive a first uplink (UL) grant in response to the transmitted SR;

transmit a beam failure recovery request (BFRQ) in the received first UL grant; and receive a second UL grant in response to the transmitted BFRQ.

2. The UE of claim 1, wherein the resource list for NBI includes an NBI reference signal.

3. The UE of claim 2, wherein the NBI reference signal corresponding to the first new candidate beam index is transmitted via the first special cell.

4. The UE of claim 2, wherein the NBI reference signal corresponding to the first new candidate beam index is transmitted via another cell.

5. The UE of claim 1, wherein the BFRQ is transmitted in a BFR medium access control (MAC) control element (CE).

6. The UE of claim 1, wherein the at least one BFD reference signal is configured in the resource list for BFD.

7. The UE of claim 1, wherein the at least one processor is further configured to execute the computer-executable instructions to:

select one NBI reference signal from the resource list for NBI included in the first special cell BFR configuration to determine the first new candidate beam index.

8. The UE of claim 1, wherein the at least one processor is further configured to execute the computer-executable instructions to:

receive a secondary cell (Scell) BFR configuration corresponding to a SCell, wherein the beam failure recovery request further includes a cell index of the SCell in which beam failure occurs and a second new candidate beam index for the SCell.

9. The UE of claim 1, wherein the BFRQ comprises the first new candidate beam index.

10. A method for beam failure recovery (BFR) performed by a user equipment (UE), the method comprising:

receiving a special cell BFR configuration corresponding to a first special cell, the special cell BFR configuration including at least one of a resource list for beam failure detection (BFD) and a resource list for new beam identification (NBI), the first special cell comprising one of a primary cell (PCell) and a primary secondary cell group (SCG) cell (PSCell);

detecting a beam failure condition in the first special cell;

determining a first new candidate beam index for the first special cell based on the special cell BFR configuration;

transmitting a scheduling request (SR) for BFR;

receiving a first uplink (UL) grant in response to the transmitted SR;

transmitting a beam failure recovery request (BFRQ) in the received first UL grant; and receiving a second UL grant in response to the transmitted BFRQ.

11. The method of claim 10, wherein the resource list for NBI includes an NBI reference signal.

12. The method of claim 11, wherein the NBI reference signal corresponding to a first new candidate beam index is transmitted via the first special cell.

13. The method of claim 12, wherein a reference signal corresponding to the first new candidate beam index is transmitted via another cell.

14. The method of claim 10, wherein the BFRQ is transmitted in a BFR medium access control (MAC) control element (CE).

15. The method of claim 10, wherein the at least one BFD reference signal is configured in the resource list for BFD.

16. The method of claim 10, further comprising:

selecting one NBI reference signal from the resource list for NBI included in the first special cell BFR configuration to determine the first new candidate beam index.

17. The method of claim 10, further comprising:

receiving a secondary cell (Scell) BFR configuration corresponding to a SCell;

wherein the beam failure recovery request further includes a cell index of the SCell in which beam failure occurs and a second new candidate beam index for the SCell.

18. The method of claim 10, wherein the BFRQ comprises the first new candidate beam index.

* * * * *